Figure 1:
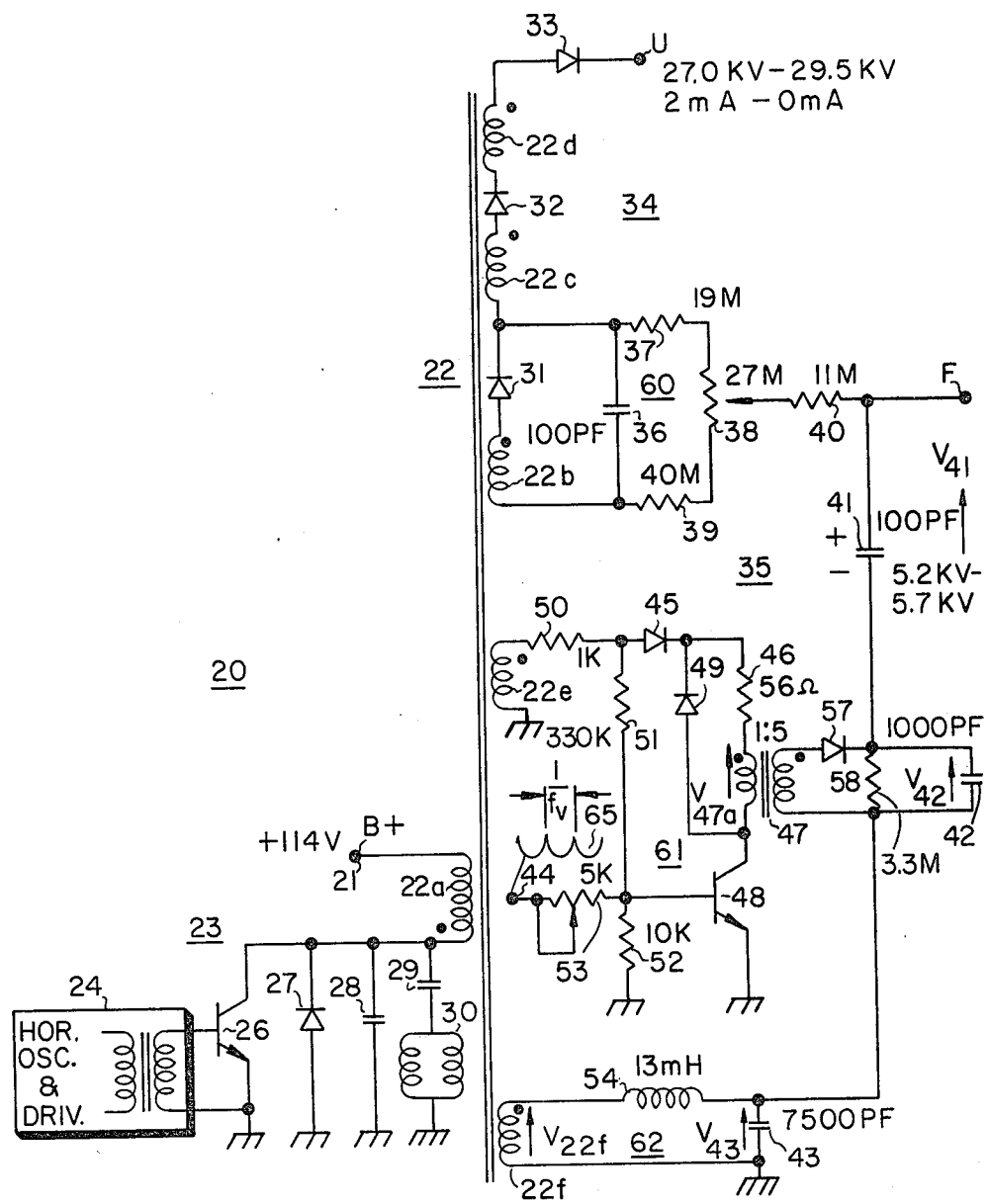

United States Patent [19]

Shiratsuchi

[11] 4,316,128
[45] Feb. 16, 1982

[54] TELEVISION RECEIVER FOCUS VOLTAGE CIRCUIT

[75] Inventor: Shinichi Shiratsuchi, Tokyo, Japan

[73] Assignee: RCA Corporation, New York, N.Y.

[21] Appl. No.: 159,328

[22] Filed: Jun. 13, 1980

[51] Int. Cl.³ .............................................. H01J 29/70
[52] U.S. Cl. ................................... 315/411; 315/382
[58] Field of Search ..................... 315/411, 382, 31 R, 315/31 TV

[56] References Cited

U.S. PATENT DOCUMENTS 2,918,602  12/1959  Fyler et al. .
3,146,373  8/1964  Janssen .

FOREIGN PATENT DOCUMENTS 52-164419  12/1977  Japan .
53-4826  1/1978  Japan .
54-14118  1/1979  Japan .
54-36123  3/1979  Japan .

OTHER PUBLICATIONS

Electrical Schematic of Sony Television Model KV-1813 published 9-15-72.

Primary Examiner—Theodore M. Blum
Attorney, Agent, or Firm—Paul J. Rasmussen; William H. Meagher; Joseph Laks

[57] ABSTRACT

The retrace pulse voltage developed by a horizontal deflection generator is applied to the primary winding of a flyback transformer. The voltage at an intermediate point of the flyback transformer high voltage winding is rectified and filtered to produce an intermediate, DC high voltage. A pulse forming circuit is coupled to a secondary winding of the flyback transformer to produce voltage pulses repeating at the horizontal deflection frequency. The amplitude of the pulses is parabolically modulated at a vertical rate. The amplitude modulated pulses are rectified and filtered to produce a parabolically shaped vertical frequency voltage. The voltage developed across another flyback transformer secondary winding is waveshaped by an LC resonant circuit to produce a sinusoidal or a substantially parabolically shaped horizontal frequency voltage. The intermediate DC high voltage and the parabolically shaped vertical and horizontal frequency voltages are summed to produce the focus voltage.

9 Claims, 4 Drawing Figures (a) $V_{22f}$ (b) $V_{43}$

TELEVISION RECEIVER FOCUS VOLTAGE CIRCUIT

This invention relates to modulated focus voltage circuits for television display picture tubes.

Television broadcasting may include the broadcasting of programs which require the television receiver to display alphanumeric characters. These characters may be displayed on the picture tube screen at positions near the screen edges. Using typical focus circuits, electron beam defocusing occurs near the screen edges, resulting in blurred contours of the displayed alphanumeric characters.

To provide sharper focusing of the electron beams landing near the screen edges, focus voltage modulating circuits vary the picture tube focus voltage from a substantially DC voltage to one which includes parabolically shaped components repeating at the vertical and horizontal frequencies. Conventional focus voltage modulating circuits typically dissipate large amounts of power or involve relatively complex circuitry. Additionally, these circuits are more suited for use in picture tubes requiring relatively low focus voltages such as black and white picture tubes. It is relatively impractical to adapt these circuits for color picture tubes which require relatively high focus voltages of several kilovolts.

The focus voltage modulating circuit embodying the invention is a relatively simple, low power consumption circuit capable of providing a modulated focus voltage of several kilovolts that may be used in color picture tubes. A source of alternating polarity voltage is coupled to a first winding of an input transformer. A substantially direct current high voltage is generated from the voltage developed across a second winding of the input transformer. A pulse forming circuit coupled to a third winding develops a voltage pulse each cycle of the alternating polarity voltage. The amplitude of each voltage pulse is varied at a vertical rate. From these vertical rate varying amplitude voltage pulses, a substantially parabolically shaped vertical frequency voltage is produced. The parabolically shaped vertical frequency voltage and the direct current high voltage are summed to produce the focus voltage.

In a further embodiment of the invention, the input transformer comprises a flyback transformer. The voltage developed across a fourth winding of the flyback transformer is waveshaped by an LC resonant circuit to produce a sinusoidal or substantially parabolically shaped horizontal frequency voltage. The parabolically shaped horizontal frequency voltage is summed with the already summed direct current high voltage and parabolically shaped vertical frequency voltage to provide further improved beam focusing at the right and left sides of the scanned raster.

Figure 2:
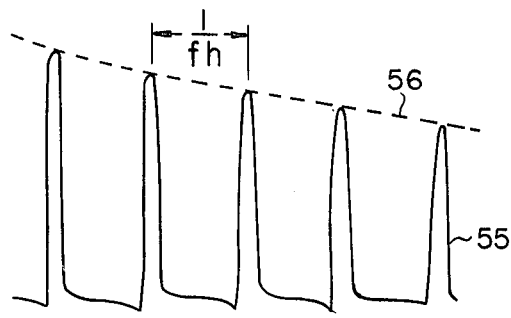
Figure 2:
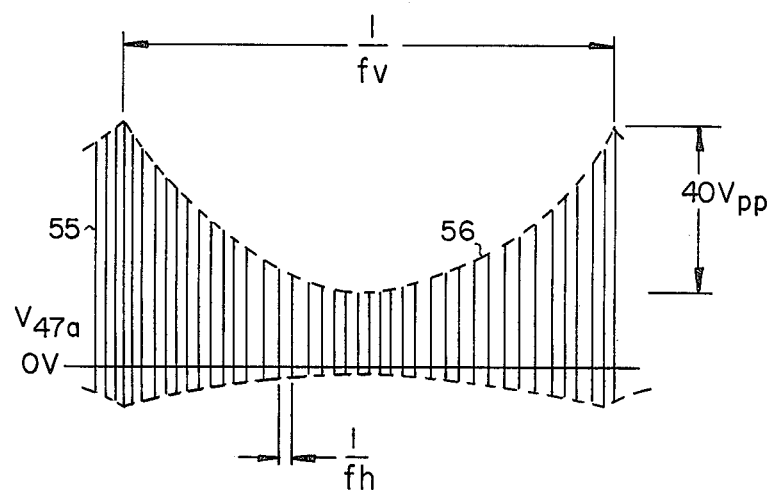
Figure 3:
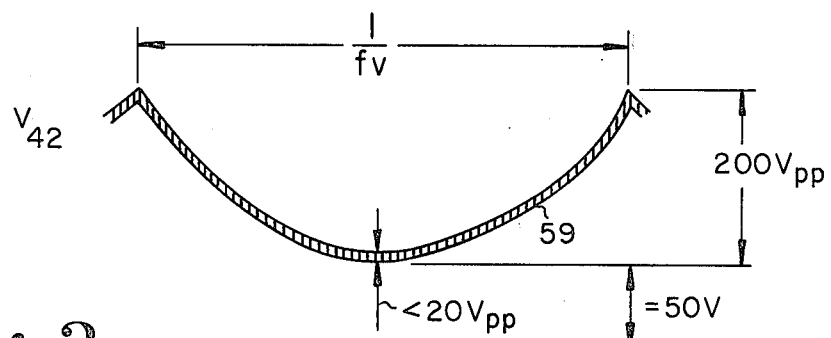
Figure 4:
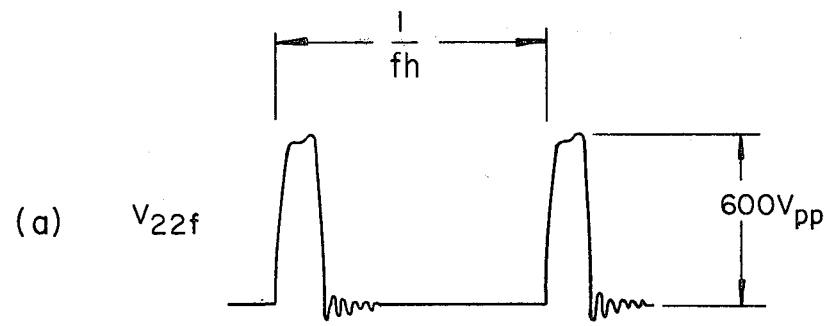
Figure 4:
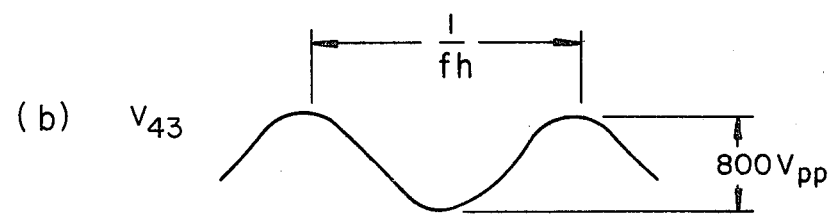

FIG. 1 illustrates a horizontal deflection circuit including a focus voltage circuit embodying the invention; and FIGS. 2-4 illustrate waveforms associated with the circuit of FIG. 1.

In the horizontal deflection circuit 20, illustrated in FIG. 1, a source of B+ scanning voltage, illustratively of +114 volts DC, is developed at a terminal 21 coupled to one end of the primary winding 22a of an input or flyback transformer 22. The other end of primary winding 22a is coupled to a horizontal deflection generator 23 at the collector of a horizontal output transistor 26. Horizontal deflection generator 23 comprises a horizontal oscillator and driver 24, horizontal output transistor 26, a damper diode 27, a retrace capacitor 28, and the series arrangement of an S-shaping capacitor 29 and a horizontal deflection winding 30.

A high voltage circuit 34, for developing an ultor accelerating potential at a terminal U coupled to the ultor of a picture tube, not shown, comprises high voltage windings 22b-22d of flyback transformer 22 and diodes 31-33 poled to conduct during the retrace interval of each horizontal deflection cycle. Horizontal deflection generator 23 functions as a source of an alternate polarity retrace pulse voltage applied across flyback transformer primary winding 22a. The retrace pulse voltage is stepped up by high voltage windings 22b-22d and rectified by diodes 31-33 to produce a DC ultor accelerating potential in conjunction with the ultor filter, not shown.

A dynamic or modulated focus voltage is developed between a terminal F and ground by a focus circuit 35. Terminal F is coupled to the focus electrode of a picture tube, not shown. Coupled between terminal F and ground is the series arrangement of three capacitors 41-43. An intermediate, substantially direct current high voltage $V_{41}$ is developed across capacitor 41 by a DC circuit 60. A substantially parabolically shaped vertical frequency voltage is developed across capacitor 42 by a vertical parabola focus circuit 61. A substantially parabolically shaped horizontal frequency voltage is developed across capacitor 43 by a circuit 62. The modulated focus voltage developed at terminal F therefore comprises the sum of the voltages developed across capacitors 41-43.

To develop the intermediate, DC high voltage across capacitor 41, the retrace pulse voltage developed across flyback transformer winding 22b is rectified by diode 31 and filtered by a capacitor 36 to produce a relatively large DC voltage across the capacitor. A voltage divider comprising resistors 37-39 is coupled across capacitor 36. The wiper arm of resistor 38 is coupled through a resistor 40 to capacitor 41 at terminal F, thereby producing the intermediate DC high voltage across capacitor 41.

In the vertical parabola focus voltage circuit 61, a voltage divider comprising resistors 50-52 is coupled across a flyback transformer secondary winding 22e. The junction of resistors 50 and 51 is coupled to the collector of a pulse forming transistor 48 through a diode 45, a resistor 46 and the primary winding of a step-up transformer 47. A damping diode 49 is coupled between the collector of transistor 48 and the junction of diode 45 and resistor 46.

A parabolic voltage 65, repeating at the vertical deflection frequency fv, is applied to a terminal 44 from a conventional vertical parabola generator, not illustrated. Terminal 44 is coupled through a resistor 53 to the base of transistor 48 at the junction of resistors 51 and 52.

The retrace pulse voltage developed across flyback transformer winding 22e is applied through resistors 50 and 51 to the base of transistor 48, switching the transistor into conduction during the horizontal retrace interval of each deflection cycle. With each conduction of transistor 48, a voltage pulse 55, illustrated in FIG. 2a, repeating at the horizontal deflection frequency, fn, is produced across the primary winding of transformer 47. The biasing of transistor 48 is such that, when conducting, the transistor functions as an amplifier for the vertical, input parabola voltage 65 applied to the base of the transistor. As illustrated by the dashed-line envelope waveform 56 of FIGS. 2a and 2b, the amplitude of the voltage pulses 55 varies at a vertical rate in a parabolic manner to produce the voltage $V_{47a}$ across the primary winding of transformer 47. In the voltage waveform $V_{47a}$ of FIG. 2b, the voltage pulses 55 are schematically illustrated as vertical lines.

The vertical rate varying amplitude voltage pulses are stepped up by the secondary winding of transformer 47, rectified by a diode 57, and filtered by capacitor 42. A discharge resistor 58 is coupled across capacitor 42, thereby enabling diode 57 to function as a detector of the vertical rate, parabolic modulation of the amplitude of the pulses developed across the secondary winding of transformer 47. As illustrated in FIG. 3, the voltage $V_{42}$ across capacitor 42 comprises a parabolically shaped vertical frequency voltage waveform with relatively little horizontal rate ripple 59 present, as schematically illustrated. With capacitors 41 and 42 in series, the intermediate, DC high voltage developed across capacitor 41 and the parabolically shaped vertical frequency voltage developed across capacitor 42 are summed and applied to focus terminal F.

To produce a substantially parabolically shaped horizontal frequency voltage across capacitor 43, the series arrangement of capacitor 43 and an inductor 54 is coupled across a flyback transformer secondary winding 22f. The retrace pulse voltage $V_{22f}$ developed across flyback transformer 21f is illustrated in FIG. 4a. This retrace pulse voltage is sinusoidally or resonantly waveshaped by capacitor 43 and inductor 54 to produce the required approximately parabolically shaped voltage $V_{43}$ across capacitor 43 as illustrated in FIG. 4b. With capacitor 43 series arranged with the other two capacitors 41 and 42, the modulated focus voltage applied to terminal F comprises the sum of the parabolically shaped horizontal frequency voltage developed across capacitor 43 and the summed intermediate, direct current high voltage and parabolically shaped vertical frequency voltage previously discussed.

As described, modulated focus voltage circuit 35 dissipates relatively little energy as the dissipation in transistor 48 is relatively small due to the relatively short duty cycle of the transistor. Further reduction in dissipation and voltage stress on transistor 48 is achieved due to the transistor being required to provide only relatively low amplitude modulation of the parabolic component of the focus voltage at terminal F. Relatively little of the DC portion of the focus voltage is applied to transistor 48 because much of the DC voltage is provided by DC circuit 60. The amount of amplitude modulation by transistor 48 is further reduced by providing a step-up transformer 47.

The circuit of FIG. 1, with the values indicated in FIGS. 1-4, was used to provide a modulated focus electrode voltage to an RCA corporation color picture tube, 19VHBP22, delta gun, thick neck, 90° deflection, bipotential focus.

What is claimed is:

1. A picture tube focus voltage circuit with vertical frequency modulation of the focus voltage, comprising:
   a source of alternating polarity voltage;
   an input transformer having first, second and third windings, said first winding being coupled to said source;
   means coupled to said second winding for generating a substantially direct current high voltage;
   means coupled to said third winding for forming a voltage pulse each cycle of said alternating polarity voltage;
   means coupled to said voltage pulse forming means for varying the amplitude of said voltage pulse at a vertical rate in a parabolic manner;
   an envelope detector coupled to said voltage pulse forming means for detecting the parabolic modulation of the amplitude of said voltage pulse to produce a substantially parabolically shaped vertical frequency voltage; and
   means for summing said direct current high voltage and said parabolically shaped vertical frequency voltage to produce said focus voltage.

2. A circuit according to claim 1 wherein said voltage pulse forming means comprises transistor means responsive to the voltage developed across said third winding and switched into conduction each cycle of said alternating polarity voltage.

3. A circuit according to claim 2 including means for applying a vertical rate bias voltage to said transistor means to vary the conduction of said transistor means at a vertical rate.

4. A circuit according to claim 3 including a second transformer with a first winding coupled to said voltage pulse forming means and a second winding coupled to said detector.

5. A circuit according to claim 1 wherein said source of alternating polarity voltage comprises a horizontal deflection generator and said input transformer comprises a flyback transformer.

6. A circuit according to claim 5 including means for providing said focus voltage with horizontal frequency modulation.

7. A circuit according to claim 6 wherein said focus voltage horizontal frequency modulation providing means comprises a fourth winding of said flyback transformer, means for waveshaping the voltage developed across said fourth winding into a substantially parabolically shaped horizontal frequency voltage and means for summing said parabolically shaped horizontal frequency voltage with the summed direct current high voltage and parbolically shaped vertical frequency voltage.

8. A circuit according to claim 1 wherein said focus voltage is developed across first and second terminals, wherein said direct current high voltage generating means develops said direct current substantially free of vertical rate variation and includes a first capacitor across which said direct current high voltage is developed and wherein said detector includes a second capacitor across which said parabolically shaped vertical frequency voltage is developed, said first and second capacitors being coupled in series across said first and second terminals.

9. A circuit according to claim 8 including a third capacitor coupled in series with the other two capacitors across said first and second terminals and means for developing across said third capacitor a horizontal rate voltage suitable for providing horizontal modulation of said focus voltage.

* * * * *